United States Patent
Faruque et al.

(10) Patent No.: US 11,433,848 B1
(45) Date of Patent: Sep. 6, 2022

(54) AIRBAGS SUPPORTED BY CENTER CONSOLE WITH NON-INFLATABLE PANEL

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/348,015

(22) Filed: Jun. 15, 2021

(51) Int. Cl.
*B60R 21/2338* (2011.01)
*B60R 21/215* (2011.01)
*B60R 21/264* (2006.01)
*B60R 21/231* (2011.01)

(52) U.S. Cl.
CPC ........ *B60R 21/2338* (2013.01); *B60R 21/215* (2013.01); *B60R 21/264* (2013.01); *B60R 2021/23107* (2013.01); *B60R 2021/23153* (2013.01); *B60R 2021/23161* (2013.01); *B60R 2021/23382* (2013.01)

(58) Field of Classification Search
CPC .......... B60R 2021/23107; B60R 2021/23153; B60R 2021/23161; B60R 21/2338; B60R 21/23386
See application file for complete search history.

(56) References Cited

U.S. PATENT DOCUMENTS

| | | | | |
|---|---|---|---|---|
| 5,934,701 | A * | 8/1999 | Furukawa | B60R 21/231 |
| | | | | 280/729 |
| 8,573,649 | B2 * | 11/2013 | Baccelli | B60R 22/22 |
| | | | | 280/808 |
| 9,434,340 | B2 * | 9/2016 | Egusa | B60R 21/23138 |
| 9,688,232 | B1 * | 6/2017 | Loew | B60R 21/231 |
| 10,471,923 | B2 * | 11/2019 | Jimenez | B60R 21/213 |
| 10,543,802 | B1 | 1/2020 | Makowski et al. | |
| 10,632,956 | B2 * | 4/2020 | Schneider | B60R 21/207 |
| 10,814,821 | B2 * | 10/2020 | Park | B60R 21/233 |
| 10,906,496 | B2 * | 2/2021 | Baccouche | B60R 21/213 |
| 10,926,735 | B2 * | 2/2021 | Deng | B60R 21/231 |
| 11,267,427 | B1 * | 3/2022 | Deng | B60R 21/207 |
| 2008/0129024 | A1 * | 6/2008 | Suzuki | B60R 21/23138 |
| | | | | 280/743.1 |

(Continued)

FOREIGN PATENT DOCUMENTS

| CN | 113002475 A | * | 6/2021 | ........ B60R 21/207 |
|---|---|---|---|---|
| DE | 19916850 A1 | | 10/2000 | |

(Continued)

*Primary Examiner* — Nicole T Verley
(74) *Attorney, Agent, or Firm* — Frank A. MacKenzie; Bejin Bieneman PLC

(57) ABSTRACT

An assembly for a vehicle includes a center console. The assembly includes a first airbag supported by the center console. The first airbag is inflatable away from the center console to an inflated position. The assembly includes a second airbag supported by the center console adjacent the first airbag. The second airbag is inflatable away from the center console to an inflated position. The assembly includes a non-inflatable panel extending from the first airbag to the second airbag when the first airbag and the second airbag are in the inflated position.

20 Claims, 5 Drawing Sheets

(56) References Cited

U.S. PATENT DOCUMENTS

| | | | |
|---|---|---|---|
| 2009/0001695 A1* | 1/2009 | Suzuki | B60R 21/231 |
| | | | 280/730.2 |
| 2012/0200070 A1* | 8/2012 | Baccelli | B60R 21/20 |
| | | | 280/808 |
| 2017/0361800 A1* | 12/2017 | Ohachi | B60R 21/207 |
| 2018/0215338 A1 | 8/2018 | Faruque et al. | |
| 2019/0217804 A1* | 7/2019 | Cho | B60R 21/233 |
| 2019/0315303 A1 | 10/2019 | Kia et al. | |
| 2020/0017058 A1 | 1/2020 | Jaradi et al. | |
| 2020/0023802 A1* | 1/2020 | Makowski | B60R 21/2346 |
| 2020/0317155 A1* | 10/2020 | Deng | B60R 21/23138 |
| 2021/0213904 A1* | 7/2021 | Parker | B60R 21/23138 |

FOREIGN PATENT DOCUMENTS

| | | | | |
|---|---|---|---|---|
| DE | 10361227 A1 | | 7/2005 | |
| DE | 102018117550 A1 | * | 1/2019 | B60R 21/203 |
| DE | 102020108632 A1 | * | 10/2020 | B60R 21/20 |
| FR | 2931420 A1 | | 11/2009 | |
| GB | 2289242 B | | 7/1998 | |
| GB | 2564549 A | * | 1/2019 | B60R 21/205 |
| KR | 20210144377 A | * | 5/2020 | |
| WO | 2006128591 A1 | | 12/2006 | |
| WO | WO-2016147683 A1 | * | 9/2016 | B60R 21/0136 |
| WO | WO-2017143010 A1 | * | 8/2017 | B60R 21/23138 |
| WO | WO-2021146121 A1 | * | 7/2021 | B60R 21/207 |

\* cited by examiner

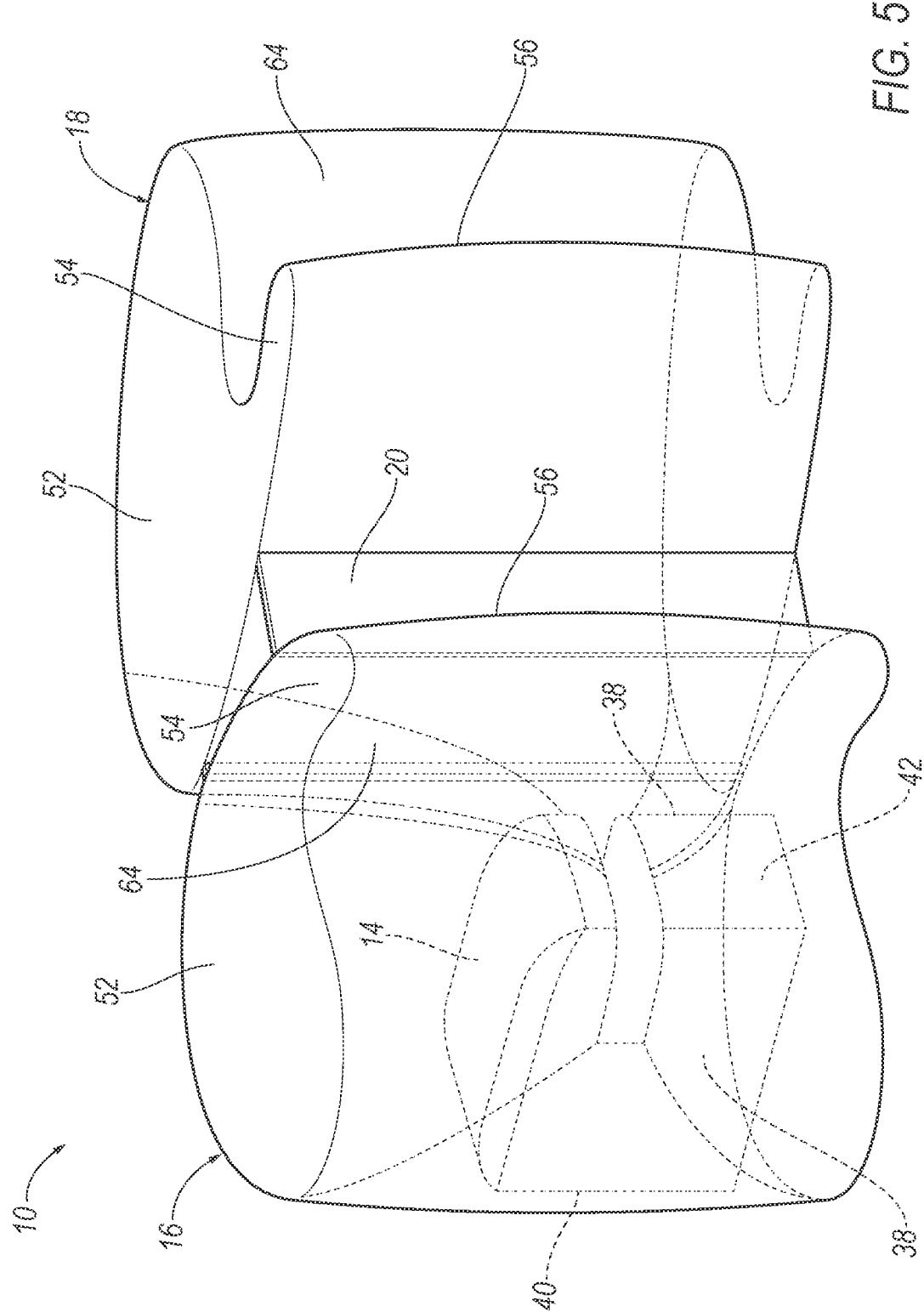

AIRBAGS SUPPORTED BY CENTER CONSOLE WITH NON-INFLATABLE PANEL

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger cabins of vehicles. Vehicles typically include, for example, a driver airbag mounted in the steering wheel, a passenger airbag mounted in the dashboard in a vehicle-forward direction from the front passenger seat, and side air curtains mounted in the roof rails, among others.

BRIEF DESCRIPTION OF THE DRAWINGS

FIG. 5 is a perspective view of the airbags and center console with the airbags in the inflated positions.

DETAILED DESCRIPTION

Figure 1:
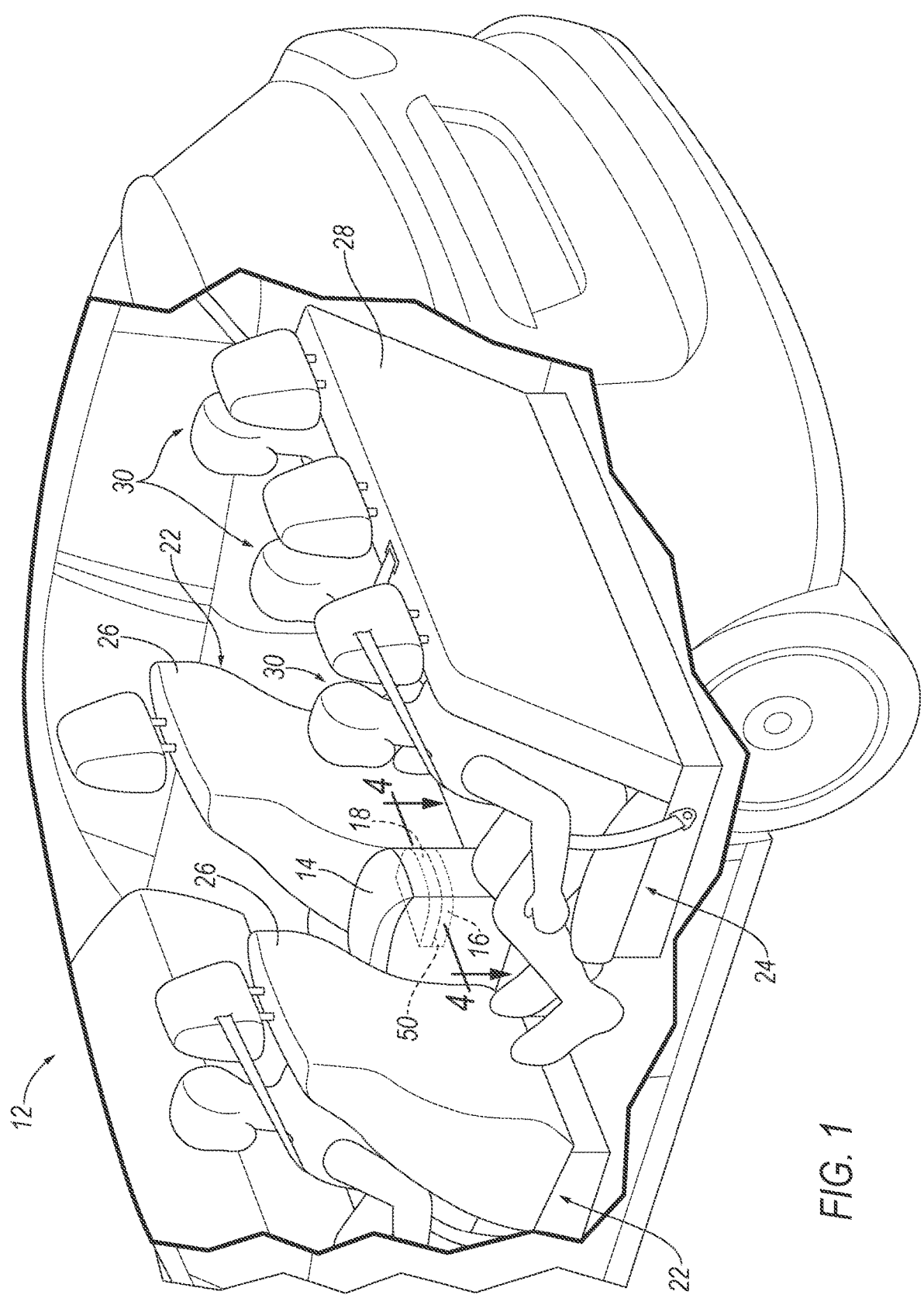
FIG. 1 is a perspective view of a vehicle having a pair of airbags in uninflated positions supported on a center console.

An assembly includes a center console. The assembly includes a first airbag supported by the center console. The first airbag is inflatable away from the center console to an inflated position. The assembly includes second airbag supported by the center console adjacent the first airbag. The second airbag is inflatable away from the center console to an inflated position. The assembly includes a non-inflatable panel extending from the first airbag to the second airbag when the first airbag and the second airbag are in the inflated position.

The non-inflatable panel may be spaced from the center console in a vehicle-rearward direction when the first airbag and the second airbag are in the inflated position.

The first airbag and the second airbag may both inflate in the vehicle-rearward direction from the center console to the inflated position.

The first airbag and the second airbag may be positioned relative to each other in a cross-vehicle direction.

The non-inflatable panel may extend in the cross-vehicle direction from the first airbag to the second airbag when the first airbag and the second airbag are in the inflated position.

The assembly may include second non-inflatable panel extending from the first airbag to the second airbag when the first airbag and the second airbag are in the inflated position, the second non-inflatable panel being spaced from the non-inflatable panel along a vehicle-longitudinal axis.

The assembly may include a front seat and a rear seat spaced from the front seat along a vehicle-longitudinal axis, the first airbag being inflatable between the front seat and the rear seat.

The non-inflatable panel may be between the front seat and the rear seat when the first airbag is in the inflated position.

The non-inflatable panel may be between the center console and the rear seat.

The assembly may include a second front seat spaced cross-vehicle from the front seat by the center console, the second airbag being between the second front seat and the rear seat.

The first airbag may abut the front seat in the inflated position and the second airbag abuts the second front seat in the inflated position.

The first airbag and the second airbag may each extend from the center console to a distal end, the distal ends of the airbags abutting the rear seat and being designed to be between occupants seated in the rear seat in the inflated positions.

The center console may include a midline extending along a vehicle-longitudinal axis, the first airbag and the second airbag each inflating outboard on opposite sides of the midline.

The first airbag and the second airbag may each include a main chamber and a protrusion extending vehicle-rearward from the main chamber in the inflated positions.

The main chamber and the protrusion of each of the first airbag and the second airbag may define an impact panel being concave and facing vehicle-rearward in the inflated positions.

The main chamber and the protrusion of each of the first airbag and the second airbag may each include at least one internal tether.

The assembly may include an inflator supported by the center console, the inflator being fluidly connected to the first airbag and the second airbag.

The center console may include a side facing vehicle-rearward, the first airbag and the second airbag being supported on the side.

The assembly may include a cover supported by the side, the first airbag and the second airbag being between the cover and the side in an uninflated position.

The assembly may include an inflator supported by the side, the inflator being fluidly connected to the first airbag and the second airbag.

With reference to the Figures, wherein like numerals indicate like parts throughout the several views, an assembly 10 for a vehicle 12 includes a center console 14. The assembly 10 includes a first airbag 16 supported by the center console 14. The first airbag 16 is inflatable away from the center console 14 to an inflated position. The assembly 10 includes second airbag 18 supported by the center console 14 adjacent the first airbag 16. The second airbag 18 is inflatable away from the center console 14 to an inflated position. The assembly 10 includes a non-inflatable panel 20 extending from the first airbag 16 to the second airbag 18 when the first airbag 16 and the second airbag 18 are in the inflated position.

In the event of an impact to the vehicle 12, e.g., a frontal impact or an oblique impact, the first airbag 16 and the second airbag 18 may move to the inflated position away from the center console 14. The airbags 16, 18 may control the kinematics of occupants in a seat of the vehicle 12, e.g., a rear seat 24. The non-inflatable panel 20 extends from the first airbag 16 to the second airbag 18 and may control vehicle-outboard movement of the first airbag 16 and the second airbag 18 during inflation to the inflated position. The airbags 16, 18 converge vehicle-forward of the non-inflatable panel 20 at the center console 14. The non-inflatable panel 20 connects the first airbag 16 to the second airbag 18 to control vehicle-outboard movement of the first airbag 16 and the second airbag 18 during inflation. The non-inflatable panel 20 allows the first airbag 16 and the second airbag 18 to control the kinematics of vehicle-outboard occupants of the rear seat 24 of the vehicle 12 and the non-inflatable panel 20 may control kinematics of an occupant between the vehicle-outboard occupants, e.g., a middle occupant. The first airbag 16, the second airbag 18, and the non-inflatable panel 20 may control the kinematics of the head, neck, and/or torso of occupants in the rear seat 24. The first airbag 16 and the second airbag 18 may extend between the occupants of the rear seat 24 of the vehicle 12 to limit occupant interaction in the event of an impact to the vehicle 12. Specifically, the airbags 16, 18 may include a portion, e.g., a protrusion 54 as described further below, that extends between the occupants to limit interaction between occupants in the rear seat 24.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered). The body may also include rockers, roof rails, pillars, body panels, vehicle floor, vehicle roof, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

Figure 2:
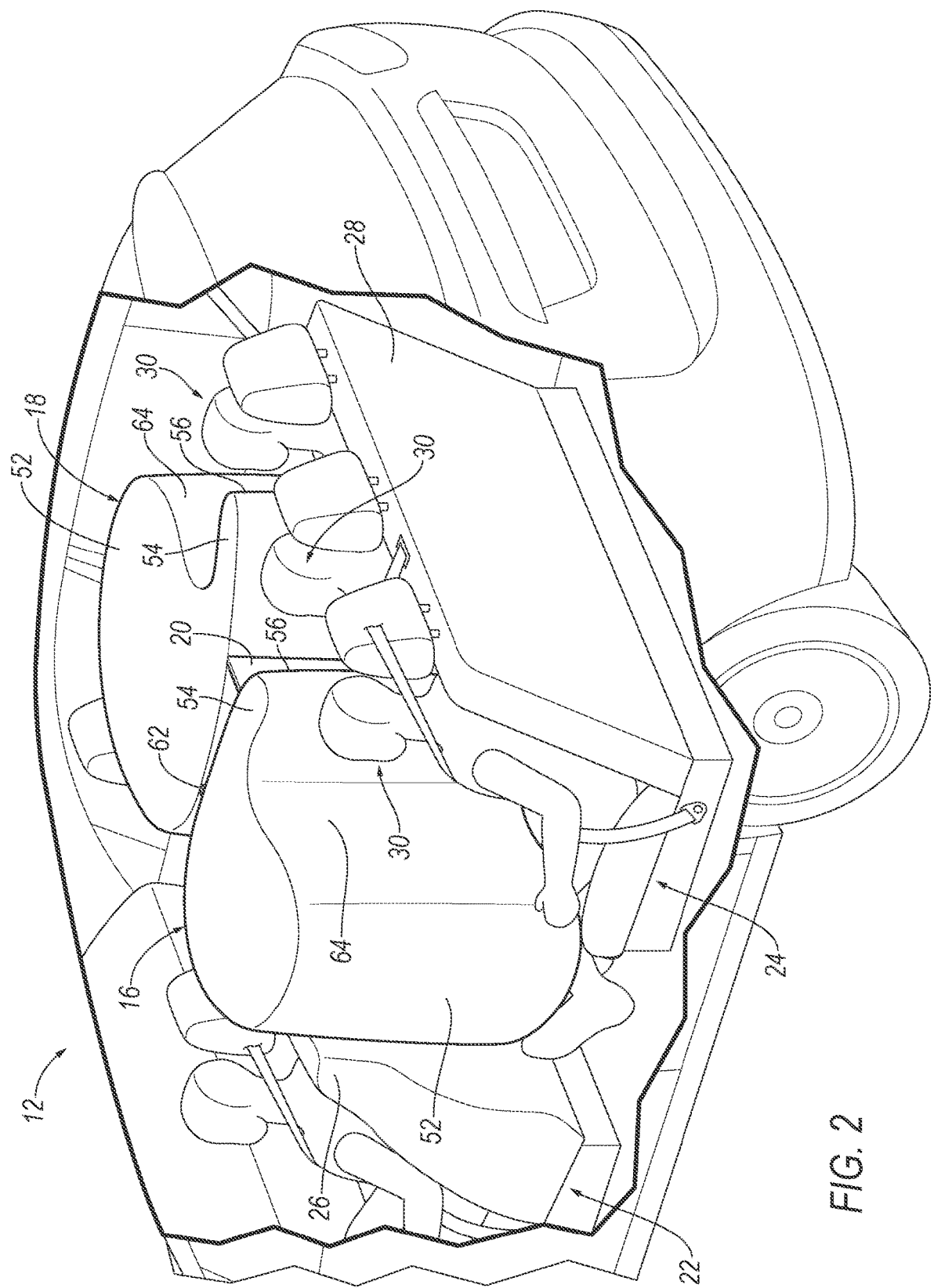
FIG. 2 is a perspective view of the vehicle having the pair of airbags in inflated positions supported on a center console.
Figure 3:
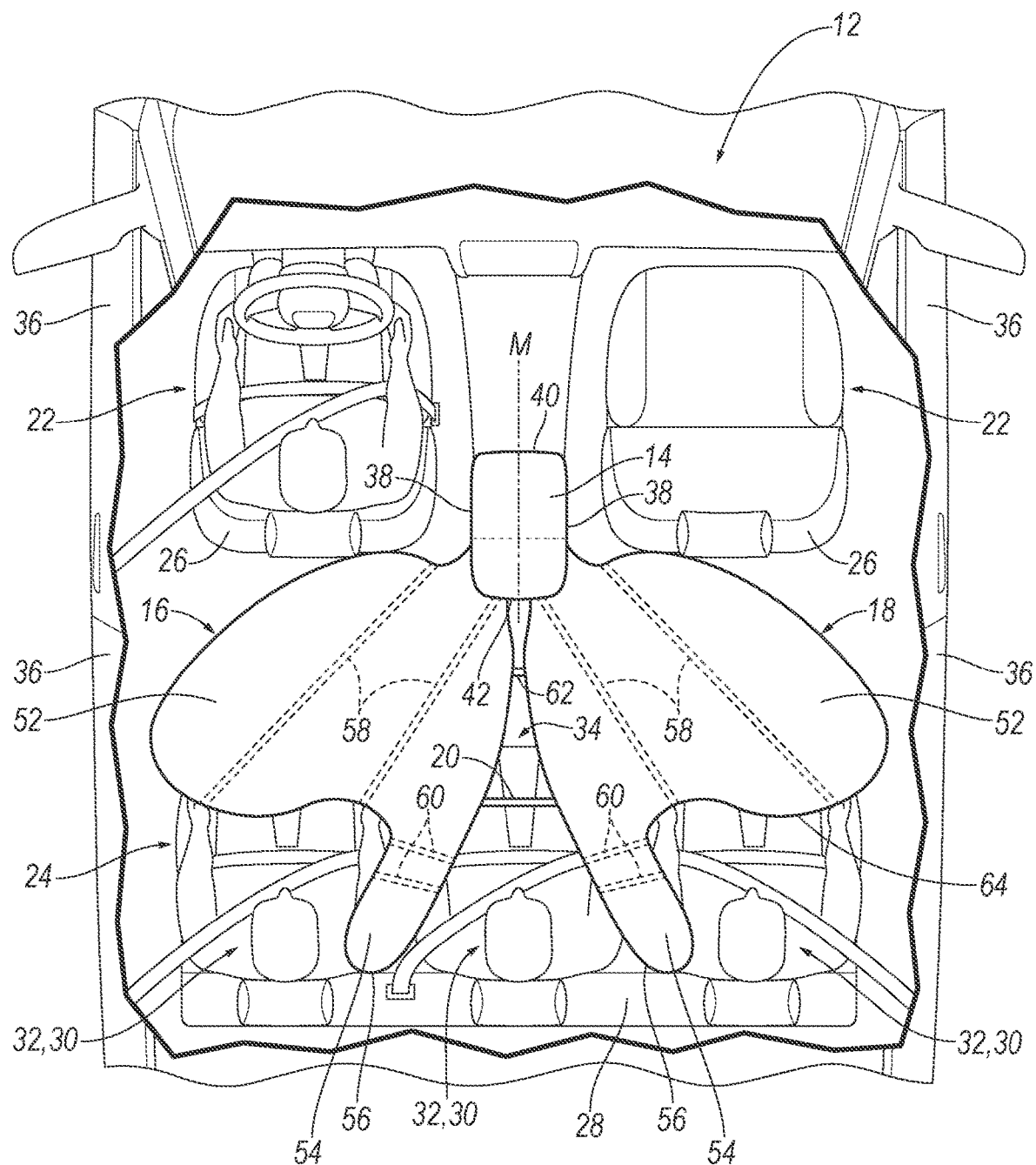
FIG. 3 is a plan view of the airbags supported by the center console in the inflated positions.

With reference to FIGS. 1-3, the vehicle 12 may include one or more seats 22, 24. Specifically, the vehicle 12 may include any suitable number of seats 22, 24. The seats 22, 24 are supported by a vehicle floor (not numbered). The seats 22, 24 may be arranged in any suitable arrangement in the passenger compartment. As in the example shown in the Figures, one or more of the seats 22, 24 may be at the front end of the passenger compartment, e.g., a driver seat and/or a passenger seat, i.e., front seats 22. As in the example shown in the Figures, the vehicle 12 may include two front seats 22 spaced cross-vehicle from each other. One or more of the seats 22, 24 may be behind the front end of the passenger compartment, e.g., at the rear end of the passenger compartment, i.e., rear seats 24. The front seats 22 are spaced from the rear seats 24 along a vehicle-longitudinal axis. As used herein, any seat that is vehicle-forward of another seat may be a "front seat 22" and any seat that is vehicle-rearward of another seat may be a "rear seat 24." The seats 22, 24 may be movable relative to the vehicle floor to various positions, e.g., movable fore-and-aft and/or cross-vehicle.

The seats 22, 24 may be of any suitable type. As an example and as shown in the Figures, the front seats 22 may be a bucket seat. In such an example, a single occupant may be properly seated in one of the front seats 22 and the front seats 22 may be spaced cross-vehicle from each other. As another example and as shown in the Figures, the rear seat 24 may be a bench seat, i.e., the extends from one side of the passenger compartment to the other side of the passenger compartment. In such an example, multiple occupants may be properly seated in the rear seat 24. In the example shown in the Figures, three occupants may be properly seated along the rear seat 24 with two of the occupants being vehicle-outboard occupants and one of the occupants being between the vehicle-outboard occupants, i.e., a middle occupant.

The seats 22, 24, both the front seats 22 and rear seat 24, include a seatback 26, 28, a seat bottom (not numbered), and a head restraint (not numbered). The head restraint may be supported by and extend upwardly from the seatback 26, 28. The head restraint may be stationary or movable relative to the seatback 26, 28. The seatback 26, 28 may be supported by the seat bottom and may be stationary or movable relative to the seat bottom. The seatback 26, 28, the seat bottom, and the head restraint may be adjustable in multiple degrees of freedom. Specifically, the seatback 26, 28, the seat bottom, and the head restraint may themselves be adjustable. In other words, adjustable components within the seatback 26, 28, the seat bottom, and the head restraint may be adjustable relative to each other.

With continued reference FIGS. 1-3, the seatback 28 of the rear seat 24 defines an occupant seating area 30 of the seat. Specifically, as shown in the Figures, the rear seat 24 defines multiple occupant seating areas 30. The occupant seating areas 30 are the areas occupied by an occupant when properly seated on the seat bottom and the seat back of the rear seat 24. The occupant seating area 30 is in a seat-forward direction of the seatback 28 and above the seat bottom. In the example shown in the Figures, the occupant seating area 30 faces the front end of the passenger compartment. In the example shown in the Figures, the rear seat 24 defines three occupant seating areas 30, i.e., the rear seat 24 may properly seat three occupants as shown. The rear seat 24 may define any suitable number of occupant seating areas 30.

The rear seat 24 defines an occupant head area 32. Specifically, the rear seat 24 may define an occupant head area 32 for each of the occupant seating areas 30 of the rear seat 24. The occupant head areas 32 are vehicle-forward of the seatback 28 of the rear seat 24. The occupant head area 32 is the volume typically occupied by the head of an occupant in the seat of the vehicle 12.

The rear seat 24 defines an occupant knee area 34. Specifically, the rear seat 24 may define an occupant knee area 34 for each of the occupant seating areas 30 of the rear seat 24. The occupant knee area 34 is vehicle-forward of the seatback 28 of the rear seat 24. The occupant knee area 34 is the volume typically occupied by the knees of an occupant in the seat of the vehicle 12.

The vehicle 12 includes the doors 36 openable for occupants to enter and exit the passenger compartment. The roof rails contact a top edge of the doors 36 when the doors 36 are closed. Each door 36 includes a door trim (not numbered), the door frame (not numbered), and a door panel (not numbered). The door trim and the door panel are fixed relative to the door frame. The door trim is fixed opposite the door panel relative to the door frame. The door trim is inboard relative to the door frame, and the door panel is outboard relative to the door frame. The door 36 includes a window opening, an opening completely closed by the window if the window is in a fully raised position. The window opening is defined by the door trim and door panel on a bottom edge and either by the door 36 circumscribing the window opening or by the body, e.g., the A pillar, the B pillar, and the roof rail. The door panel faces outboard relative to the vehicle 12.

The doors 36 of the vehicle 12 are adjacent the front seats 22 and the rear seat 24. Each of the front seats 22 and each of the rear seat 24 may be adjacent a door 36 of the vehicle 12. Specifically, each front seat 22 may be adjacent a front door 36 and the rear seat 24 may be adjacent a rear door 36.

The doors 36 are vehicle-outboard from each of the front seats 22 and each of the rear seat 24.

With reference to FIGS. 1-5, the vehicle 12 includes the center console 14 between the two front seats 22 of the vehicle 12. Specifically, the center console 14 may be supported by the vehicle floor between two front seats 22. The front seats 22 may each be vehicle-outboard of the center console 14. The front seats 22 are spaced from each other by the center console 14. The center console 14 is adjacent each of the front seats 22. The center console 14 includes a midline M extending along a vehicle-longitudinal axis.

The center console 14 includes a fixed portion that is fixed relative to the passenger compartment. The center console 14, specifically the fixed portion, may have sides 38 that face laterally, i.e., face in a cross-vehicle direction. The sides 38 are adjacent the front seats 22, and the front seats 22 may be spaced from or may abut the sides 38. The fixed portion may have a forward side 40 and a rearward side 42 each extending in the cross-vehicle direction from one side 38 to the other side 38. Specifically, the forward side 40 is spaced vehicle-forward from the rearward side 42. The forward side 40 faces vehicle-forward and the rearward side 42 faces vehicle-rearward. The center console 14 may be formed of a rigid material, e.g., plastic.

The center console 14 includes a storage compartment (not numbered) defined by the sides 38, the forward side 40, and the rearward side 42. The storage compartment is accessible to occupants of the front seats 22 for placing items inside for storage. The storage compartment may be disposed inside the fixed portion and enclosed by a lid. The lid is rotatable between a closed position covering the storage compartment and an open position.

The vehicle 12 includes an airbag assembly 44 including the first airbag 16, the second airbag 18, the non-inflatable panel 20, an inflator 46, and may include a housing (not shown). The airbag assembly 44 is supported by the center console 14. Specifically, the airbag assembly 44 may be supported by the rearward side 42 of the center console 14. In an example in which the airbag assembly 44 includes the housing, the housing may be fixed directly to the center console 14, i.e., the rearward side 42. The airbag assembly 44 may be concealed by a cover 48 supported on the rearward side 42 of the center console 14. Specifically, the airbag assembly 44 may be between the center console 14 and the cover 48 when the airbags 16, 18 are in the uninflated position. The airbag assembly 44, i.e., the first airbag 16 and the second airbag 18, is between the cover 48 and the rearward side 42 of the center console 14 when the airbags 16, 18 are in the uninflated position. The cover 48 may be releasable, e.g., by a tear seam 50, to allow the airbags 16, 18 to move from the uninflated position to the inflated position.

Figure 4:
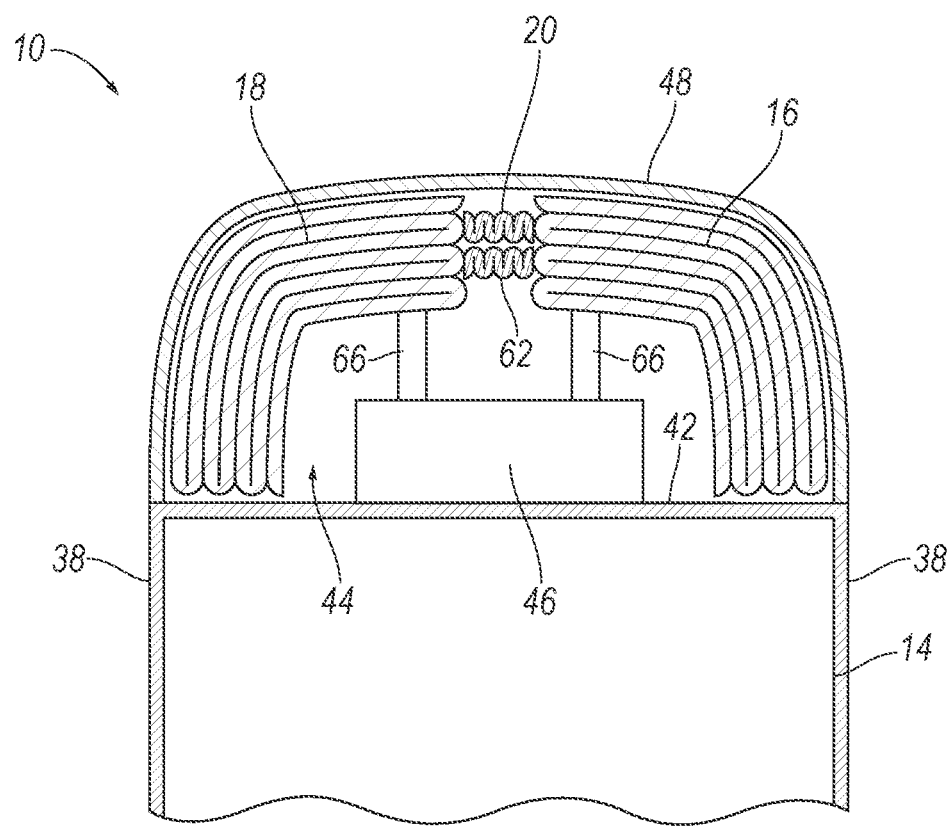
FIG. 4 is cross-sectional view of the center console with the airbags in the uninflated positions.

With reference to FIG. 4, the inflator 46 may be supported by the center console 14, i.e., the rearward side 42. In the example shown in the Figures, the inflator 46 is fluidly connected to the first airbag 16 and the second airbag 18. In such an example, the inflator 46 expands the first airbag 16 and the second airbag 18 with inflation medium, such as a gas, to move the first airbag 16 and the second airbag 18 from an uninflated position to the inflated position. The inflator 46, as shown in the Figures, may include a pair of fill tubes 66 extending from the inflator 46 to each of the airbags 16, 18. The inflation medium may pass through each of the fill tubes 66 to inflate the first airbag 16 and the second airbag 18. In other examples, the airbag assembly 44 may include a second inflator. In such an example, the inflator 46 may be fluidly connected to the first airbag 16 and the second inflator may be fluidly connected to the second airbag 18. In such an example, the inflator 46 expands the first airbag 16 to the inflated position and the second inflator expands the second airbag 18 to the inflated position. The airbag assembly 44 may include any suitable number of inflators 46 to expand the first airbag 16 and the second airbag 18 to the inflated position. The inflator 46, or inflators 46 in some examples, may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIGS. 2-5, as discussed above, the airbag assembly 44 includes the first airbag 16 and the second airbag 18. The numerical adverbs "first" and "second" with respect to the airbags 16, 18 are used herein merely as identifiers and do not signify order or importance other than indicating multiple airbags 16, 18 being a part of the airbag assembly 44. The terms "first" and "second" may be used interchangeably when referring to the airbags 16, 18 as shown in the Figures. Common numerals are used to identify common elements between the first airbag 16 and the second airbag 18.

The first airbag 16 and the second airbag 18 are each supported by the center console 14. Specifically, the first airbag 16 and the second airbag 18 are supported by the rearward side 42 of the center console 14. The second airbag 18 is supported by the center console 14 adjacent the first airbag 16. The first airbag 16 and the second airbag 18 are positioned on the center console 14 relative to each other in the cross-vehicle direction. Specifically, the first airbag 16 and the second airbag 18 may be positioned on opposite sides of the midline M in the uninflated position. In the uninflated position, the airbags 16, 18 may be concealed under the cover 48. The airbags 16, 18 are between the center console 14, i.e., rearward side 42, and the cover 48 in the uninflated position.

The first airbag 16 and the second airbag 18 are inflatable away from the center console 14 to the inflated position. Specifically, the first airbag 16 and the second airbag 18 inflate in a vehicle-rearward direction from the center console 14 to the inflated position. The first airbag 16 and the second airbag 18 each inflate outboard on opposite sides of the midline M of the center console 14. The first airbag 16 and the second airbag 18 may inflate away from the center console 14 and toward the rear doors 36 of the vehicle 12. The first airbag 16 inflates toward one of the rear doors 36 and the second airbag 18 inflates toward the other of the rear doors 36 on the opposite side of the vehicle 12.

The airbags 16, 18 are between the seats 22 at the front end of the passenger compartment, i.e., the front seats 22, and the rear seat 24. Specifically, the first airbag 16 is between one of the front seats 22 and the rear seat 24 in the inflated position and the second airbag 18 is between the other of the front seats 22 and the rear seat 24 in the inflated position. The airbags 16, 18 are between the occupant seating areas 30 for the vehicle-outboard occupants in the rear seat 24. The first airbag 16 inflates adjacent, i.e., vehicle-forward of, one of the vehicle-outboard occupants of the rear seat 24 and the second airbag 18 inflates adjacent, i.e., vehicle-forward of, the other of the vehicle-outboard occupants of the rear seat 24. The first airbag 16 abuts the seatback 26 of one of the front seats 22 and the second airbag 18 abuts the seatback 26 of the other of the front seats 22. The airbags 16, 18 use the seatbacks 26 of the front seats 22 as reaction surfaces in the event of an impact to the vehicle 12 to control the kinematics of the vehicle-outboard occupants of the rear seat 24.

With continued reference to FIG. 2-5, the second airbag 18 may be symmetrical along the vehicle-longitudinal axis with the first airbag 16. The second airbag 18 is a mirror image of the first airbag 16 over the midline M of the center console 14. The first airbag 16 and the second airbag 18 may include identical features that are reflected over the vehicle-longitudinal axis.

The first airbag 16 and the second airbag 18 each inflate to the inflated position simultaneously in the event of an impact to the vehicle 12. The first airbag 16 and the second airbag 18 inflate at the same time in the event of an impact to the vehicle 12.

With reference to FIG. 3, each of the airbags 16, 18 include a main chamber 52 and a protrusion 54 extending vehicle-rearward from the main chamber 52 when the airbags 16, 18 are in the inflated position. The main chambers 52 of the airbags 16, 18 may be adjacent the seatbacks 26 of the front seats 22. The main chamber 52 of the first airbag 16 may be adjacent one of the front seats 22 and the second airbag 18 may be adjacent the other of the front seats 22. The main chambers 52 use the seatbacks 26 of the front seats 22 as reaction surfaces for the airbags 16, 18 in the event of an impact to the vehicle 12. The seatbacks 26 may provide support for the airbags 16, 18, i.e., main chambers 52, for controlling the kinematics of occupants seated in the rear seat 24.

The protrusions 54 extend vehicle-rearward from the main chambers 52 to distal ends 56 adjacent the rear seat 24. The distal ends 56 of the protrusions 54 may abut the seatback 28 of the rear seat 24 when the airbags 16, 18 are in the inflated positions.

The first airbag 16 and the second airbag 18 may extend between occupants seated in the rear seat 24. Specifically, the protrusion 54, i.e., the distal end 56, is designed to be between one of the vehicle-outboard occupants and the middle occupant when the airbags 16, 18 are in the inflated position. The protrusions 54 of each of the airbags 16, 18 extends between the vehicle-outboard occupants and the middle occupant on each side of the middle occupant. The middle occupant is between the protrusions 54 of the first airbag 16 and the second airbag 18 when the airbags 16, 18 are in the inflated position.

The main chamber 52 and the protrusion 54 of each of the airbags 16, 18 defines an impact panel 64 facing and surrounding the occupant seating areas 30 of the rear seat 24. Specifically, the main chamber 52 and the protrusion 54 of each of the airbags 16, 18 define impact panels 64 surrounding the occupant seating areas 30 of the vehicle-outboard occupants, i.e., on either side of the middle occupant. The impact panel 64 may be concave to surround the occupant seating areas 30. The impact panel 64 may extend from the distal end 56 of the protrusion 54 and along the main chamber 52 to the door 36 adjacent the airbag. In the event of an impact to the vehicle 12 and wherein the airbags 16, 18 are in the inflated positions, the vehicle-outboard occupants may contact the impact panels 64 to control the kinematics of the vehicle-outboard occupants.

The main chamber 52 of each of the airbags 16, 18 may include tethers 58 interior to the main chamber 52. Specifically, the tethers 58 may extend across the interior of the main chambers 52. The tethers 58 may maintain the shape of the main chamber 52 as the airbags 16, 18 inflate to the inflated positions. In the example shown in the Figures, each of the main chambers 52 includes a pair of tethers 58 extending across the main chambers 52. The main chambers 52 may include any suitable number of tethers 58 interior to the main chambers 52.

The protrusions 54 of each of the airbags 16, 18 may include tethers 60 interior to the protrusions 54. Specifically, the tethers 60 may extend across the interior of the protrusions 54. The tethers 60 maintain the shape of the main chamber 52 as the airbags 16, 18 inflate to the inflated positions. In the example shown in the Figures, each of the protrusions 54 includes a pair of tethers 60 extending across the protrusions 54. The protrusions 54 may include any suitable number of tethers 60 interior to the main chambers 52.

With reference to FIGS. 2-5, the airbag assembly 44 includes the non-inflatable panel 20. The inflation of the first airbag 16 and the second airbag 18 pull the non-inflatable panel 20 to deploy the non-inflatable panel 20 but the non-inflatable panel 20 is not in fluid communication with the first airbag 16 and the second airbag 18. The non-inflatable panel 20 is separate from the first airbag 16 and the second airbag 18. The non-inflatable panel 20 does not include a chamber inflatable by inflation medium and does not come into direct contact with the inflation medium. In other words, the non-inflatable panel 20 does not inflate.

The non-inflatable panel 20 extends from the first airbag 16 to the second airbag 18. The non-inflatable panel 20 is between the first airbag 16 and the second airbag 18 when the airbags 16, 18 are in the inflated position. Specifically, the non-inflatable panel 20 extends in the cross-vehicle direction between the first airbag 16 and the second airbag 18 when the airbags 16, 18 are in the inflated position.

The non-inflatable panel 20 is between the front seats 22 and the rear seat 24. The non-inflatable panel 20 is between the center console 14 and the rear seat 24. Specifically, the non-inflatable panel 20 may be spaced in the vehicle-rearward direction when the airbags 16, 18 are inflated.

The non-inflatable panel 20 is between the occupant seating area 30 for the middle occupant and the center console 14. Specifically, the non-inflatable panel 20 is between the occupant head area 32 and the occupant knee area 34 of the middle occupant. The non-inflatable panel 20 controls the kinematics of the middle occupant in the rear seat 24. Specifically, the non-inflatable panel 20 may be between the center console 14 and the occupant head area 32 and the occupant knee area 34 of the middle occupant defined by the rear seat 24. Specifically, the non-inflatable panel 20 is sized and shaped to extend between the center console 14 and the occupant head area 32 and the occupant knee area 34 for the middle occupant of the rear seat 24, i.e., the area occupied by the head and knees of the middle occupant in the rear seat 24. The non-inflatable panel 20 controls the kinematics of a middle occupant properly seated in the rear seat 24 of the vehicle 12, i.e., an occupant occupying the occupant head area 32 and occupant knee area 34 defined by the rear seat 24 in the passenger compartment.

The non-inflatable panel 20 extending from the first airbag 16 to the second airbag 18 controls the vehicle-outboard movement of the first airbag 16 and the second airbag 18 as the airbags 16, 18 move to the inflated position. The first airbag 16 and the second airbag 18 may converge vehicle-forward of the non-inflatable panel 20 when the airbags 16, 18 are in the inflated position. The first airbag 16 and the second airbag 18 meet each other vehicle-forward of the non-inflatable panel 20 at the center console 14. The non-inflatable panel 20 extending from the first airbag 16 to the second airbag 18 allows the first airbag 16 and the second airbag 18 to control the kinematics of the vehicle-outboard occupants of the rear seat 24 while the non-inflatable panel 20 controls the kinematics of the middle occupant of the rear seat 24.

The airbag assembly 44 includes a second non-inflatable panel 62 extending from the first airbag 16 and the second airbag 18. The second non-inflatable panel 62 may be spaced vehicle-rearward from the center console 14 along the vehicle-longitudinal axis. The second non-inflatable panel 62 extends in the cross-vehicle direction from the first airbag 16 to the second airbag 18. The second non-inflatable panel 62 is spaced vehicle-forward from the non-inflatable panel 20 along the vehicle-longitudinal axis. The second non-inflatable panel 62 is between the center console 14 and the non-inflatable panel 20. The second non-inflatable panel 62 controls the kinematics of the middle occupant in combination with the non-inflatable panel 20. Like the non-inflatable panel 20, the inflation of the first airbag 16 and the second airbag 18 pull the second non-inflatable panel 62 to deploy the second non-inflatable panel 62 but the second non-inflatable panel 62 is not in fluid communication with the first airbag 16 and the second airbag 18. The second non-inflatable panel 62 is separate from the first airbag 16 and the second airbag 18. The second non-inflatable does not include a chamber inflatable by the inflation medium and does not come into direct contact with the inflation medium. In other words, the second non-inflatable panel 62 does not inflate.

As shown in the Figures, the airbags 16, 18 may converge vehicle-forward of the non-inflatable panel 20 and the second non-inflatable panel 62. The non-inflatable panels 20, 62 extending from the first airbag 16 to the second airbag 18 limits vehicle-outboard movement of the airbags 16, 18 as the airbags 16, 18 move to the inflated position. Specifically, the non-inflatable panels 20, 62 may control the kinematics of the middle occupant and the airbags 16, 18 may control the kinematics of the vehicle-outboard occupants.

The first airbag 16, second airbag 18, and non-inflatable panels 20, 62 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a center console;
   a first airbag supported by the center console, the first airbag being inflatable away from the center console to an inflated position;
   a second airbag supported by the center console adjacent the first airbag, the second airbag being inflatable away from the center console to an inflated position; and
   a non-inflatable panel extending from the first airbag to the second airbag when the first airbag and the second airbag are in the inflated position.

2. The assembly of claim 1, wherein the non-inflatable panel is spaced from the center console in a vehicle-rearward direction when the first airbag and the second airbag are in the inflated position.

3. The assembly of claim 2, wherein the first airbag and the second airbag both inflate in the vehicle-rearward direction from the center console to the inflated position.

4. The assembly of claim 1, wherein the first airbag and the second airbag are positioned relative to each other in a cross-vehicle direction.

5. The assembly of claim 4, wherein the non-inflatable panel extends in the cross-vehicle direction from the first airbag to the second airbag when the first airbag and the second airbag are in the inflated position.

6. The assembly of claim 1, further comprising a second non-inflatable panel extending from the first airbag to the second airbag when the first airbag and the second airbag are in the inflated position, the second non-inflatable panel being spaced from the non-inflatable panel along a vehicle-longitudinal axis.

7. The assembly of claim 1, further comprising a front seat and a rear seat spaced from the front seat along a vehicle-longitudinal axis, the first airbag being inflatable between the front seat and the rear seat.

8. The assembly of claim 7, wherein the non-inflatable panel is between the front seat and the rear seat when the first airbag is in the inflated position.

9. The assembly of claim 7, wherein the non-inflatable panel is between the center console and the rear seat.

10. The assembly of claim 7, further comprising a second front seat spaced cross-vehicle from the front seat by the center console, the second airbag being between the second front seat and the rear seat.

11. The assembly of claim 10, wherein the first airbag abuts the front seat in the inflated position and the second airbag abuts the second front seat in the inflated position.

12. The assembly of claim 7, wherein the first airbag and the second airbag each extend from the center console to a distal end, the distal ends of the airbags abutting the rear seat and being designed to be between occupants seated in the rear seat in the inflated positions.

13. The assembly of claim 1, wherein the center console includes a midline extending along a vehicle-longitudinal axis, the first airbag and the second airbag each inflating outboard on opposite sides of the midline.

14. The assembly of claim 1, wherein the first airbag and the second airbag each include a main chamber and a protrusion extending vehicle-rearward from the main chamber in the inflated positions.

15. The assembly of claim 14, wherein the main chamber and the protrusion of each of the first airbag and the second airbag define an impact panel being concave and facing vehicle-rearward in the inflated positions.

16. The assembly of claim 14, wherein the main chamber and the protrusion of each of the first airbag and the second airbag each include at least one internal tether.

17. The assembly of claim 1, further comprising an inflator supported by the center console, the inflator being fluidly connected to the first airbag and the second airbag.

18. The assembly of claim 1, wherein the center console includes a side facing vehicle-rearward, the first airbag and the second airbag being supported on the side.

19. The assembly of claim 18, further comprising a cover supported by the side, the first airbag and the second airbag being between the cover and the side in an uninflated position.

20. The assembly of claim 18, further comprising an inflator supported by the side, the inflator being fluidly connected to the first airbag and the second airbag.

* * * * *